United States Patent [19]
Trefz et al.

[11] Patent Number: 5,354,241
[45] Date of Patent: Oct. 11, 1994

[54] BELT CLUTCH CONTROL APPARATUS

[75] Inventors: Harlin J. Trefz; Joe Deschamps, both of Jackson, Tenn.

[73] Assignee: Murray Outdoor Products Inc., Jackson, Tenn.

[21] Appl. No.: 57,524

[22] Filed: May 4, 1993

[51] Int. Cl.5 ............................................. F16H 7/08
[52] U.S. Cl. ..................................... 474/101; 474/135
[58] Field of Search ............... 474/101, 109, 111, 113, 474/117, 133, 134, 135

[56] References Cited

U.S. PATENT DOCUMENTS

| | | |
|---|---|---|
| 2,257,796 | 10/1941 | Heinke . |
| 2,791,079 | 5/1957 | Funk . |
| 2,919,756 | 1/1960 | Knipe . |
| 2,960,810 | 11/1960 | Musgrave . |
| 3,079,743 | 3/1963 | Egley . |
| 3,367,459 | 2/1968 | Rubin . |
| 3,464,282 | 9/1969 | Grobowski ........................ 474/135 |
| 3,543,892 | 12/1970 | De Baillie . |
| 3,633,699 | 1/1972 | Bishop et al. ..................... 474/135 |
| 4,058,957 | 11/1977 | Rosenberry . |
| 4,277,936 | 7/1981 | Hoff . |
| 4,696,150 | 9/1987 | Greeck, III . |
| 5,012,632 | 5/1991 | Kuhn et al. ..................... 474/135 X |

FOREIGN PATENT DOCUMENTS 2059231  9/1971  Fed. Rep. of Germany .
2728584  1/1979  Fed. Rep. of Germany .

Primary Examiner—Michael Powell Buiz
Attorney, Agent, or Firm—Heiskell, Donelson, Bearman, Adams, Williams & Caldwell

[57] ABSTRACT

A belt clutch control apparatus is disclosed having a control handle and linkage means for selectively controlling the transmission and power from a driving pulley to a driven pulley through a driving belt. In a preferred embodiment, the apparatus is specially adapted to control the operation of the cutting blades on a riding mower. The linkage includes an undercenter connecting link for transmitting rotational movement of the control shaft to a bellcrank, which engages a tension spring to operatively move an idler pulley between engaged and disengaged positions relative to the driving belt. The undercenter link moves exclusively between first and second undercenter positions, and is never forced into an overcenter position. An assist spring is provided for securing the undercenter link in both its on and off undercenter positions, thereby relieving the idler pulley spring for this purpose. The linkage significantly reduces both the travel and effort required to move the control handle between its on and off positions.

11 Claims, 3 Drawing Sheets

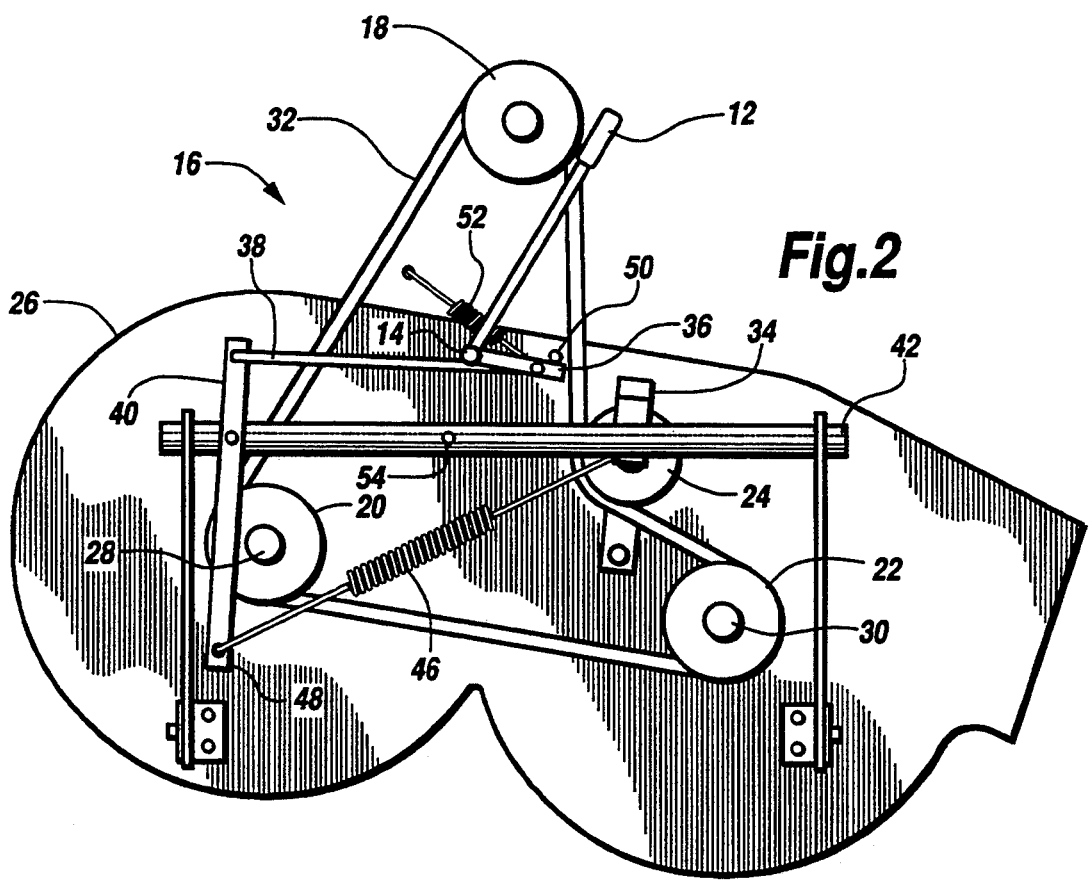
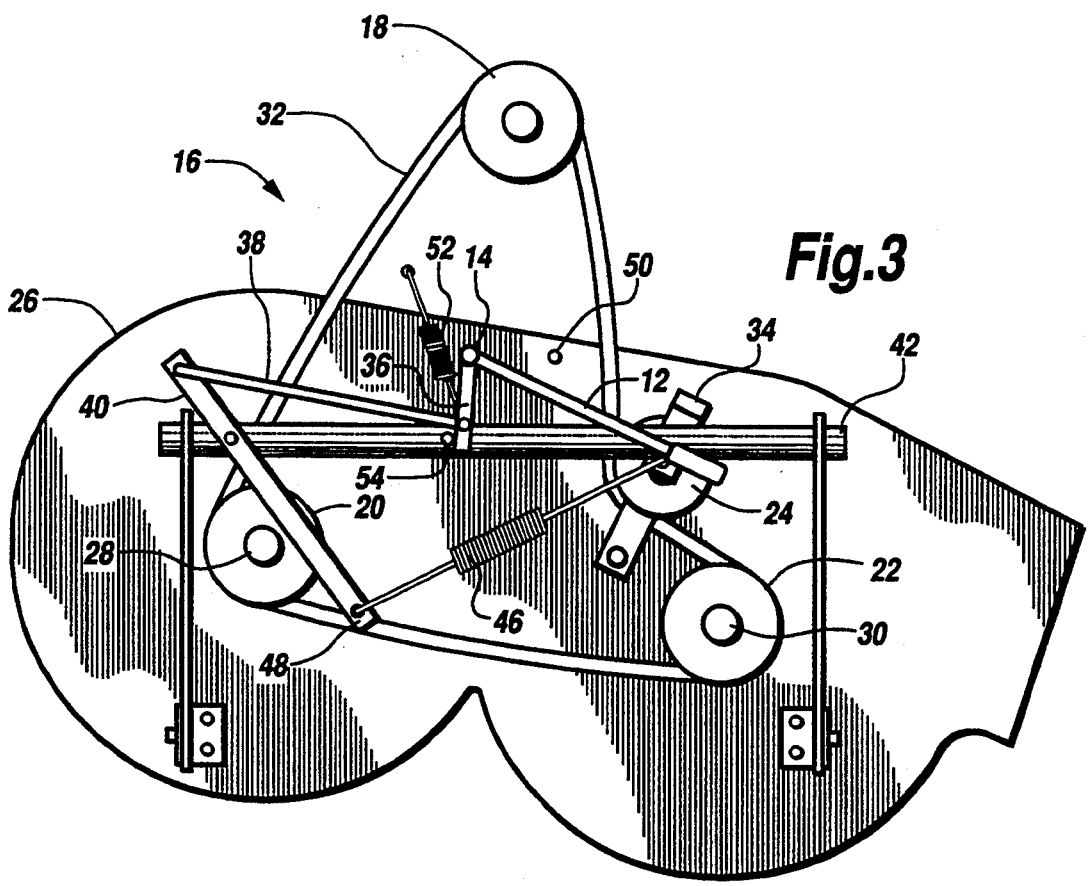

BELT CLUTCH CONTROL APPARATUS

BACKGROUND OF THE INVENTION

1. Field of the Invention

This invention relates to a belt clutch control apparatus and, more particularly, to such apparatus having an improved linkage mechanism specially adapted for use on the cutting deck of a riding lawn mower.

2. Description of the Prior Art

Belt driven systems typically comprise a driving pulley, one or more driven pulleys, a continuous belt interconnecting the driving and driven pulleys, and an idler pulley. Selective movement of the idler pulley into or out of close engaging contact with the belt serves to tighten or loosen the belt, respectively, thereby engaging or disengaging the driving pulley with the driven pulley(s) as desired. Such belt driven systems are commonly used on riding lawn mowers to allow selective engagement of the cutting blades, which are typically connected to the driven pulley(s).

Belt driven systems typically include a belt clutch control apparatus for allowing the user to move the idler pulley between the engaged and disengaged positions, as desired, by selectively moving a control handle between its respective on and off positions. Such control apparatus customarily comprise an overcenter linkage system, which includes at least one connecting link moveable from an undercenter position to an overcenter position during movement of the control handle to its on position. Additional linkage members translate movement of the connecting link to a high-tension spring, which pulls the idler pulley into engagement with the belt and maintains adequate tension on the belt to prevent slippage. The high-tension spring also serves to hold the connecting link firmly in its overcenter position to prevent inadvertent disengagement of the system.

By design, an overcenter linkage system requires that at least a portion of the total control handle movement be devoted to locking the link in its overcenter position, even after the idler pulley has moved into full engagement with the belt. This extra degree of control handle movement is effectively wasted, since its only purpose is to move the connecting link through the center position to the overcenter position (or, to the undercenter position, when disengaging the system). This "wasted movement" results in less motion being utilized to stretch the idler pulley spring, necessitating the use of a stiffer spring (i.e., a higher spring rate) to develop the load required to adequately tighten the belt.

To reduce the frequency of adjustment, the spring must be overstretched to allow for a certain degree of relaxation which occurs as the belt system wears. With a stiff spring as required for conventional overcenter linkages, the spring load becomes unacceptably high when overstretched. The high degree of force required to move the control handle in a conventional overcenter linkage system is a problem well known to those skilled in the art.

The linkage system in a conventional belt clutch control apparatus on a riding mower typically includes a bellcrank pivotally mounted to either the underside of the frame or the top of the cutting deck. A bellcrank is commonly used to interconnect the connecting link and the idler pulley spring, with each being secured to an opposite end thereof. In order to avoid inadvertent stretching of the spring when the cutting deck is in its lowest position, and consequential engagement of the cutting blades, the spring must be long and slidably secured to one end of the bellcrank, so the point of attachment between the spring and the bellcrank may vary upon raising and lowering the deck. This variation increases the amount of wasted movement in the system when the deck is raised, and increases spring tension when the deck is lowered.

A number of problems have been recognized relating to the use of overcenter linkages in belt clutch control mechanisms, particularly in the context of a riding lawn mower. Due primarily to the generally high spring rate of the idler pulley spring in conventional systems, a considerable amount of force is necessary to move the connecting link to its overcenter position. The moment created by the spring about the control shaft may be extremely high, particularly just prior to entering the region of wasted movement described above. The idler pulley normally contacts the belt relatively early in the movement of the control handle, so that the spring is actively resisting the additional movement required to move the handle to the overcenter position. Accordingly, overcenter linkages are frequently difficult for some users to operate.

As explained above, conventional overcenter linkage systems require the use of a relatively stiff spring which is typically overstretched to allow for some relaxation as the belt wears. This naturally places the belt under greater tension than necessary, resulting in increased wear of the belt and pulleys as well as the spring itself, thereby increasing the maintenance needs of these components. Frequent adjustment and/or replacement of both the spring and belt is a particular problem with some riding mower linkage systems.

Once the connecting link has passed the center position during movement of the connecting link to the engaged position, the spring pulls the linkage firmly to the overcenter position. Similarly, during movement of the connecting link to its disengaged position, the spring pulls the linkage firmly, and rapidly, to its disengaged position. Such sudden movement of the linkage, and the resulting movement of the control handle, can result in injury to the user if the movement is not expected and a secure grip on the handle is not carefully maintained.

An additional problem with conventional systems arises from the additional handle movement required to move the connecting link to its overcenter position. With modern mowers, it is frequently difficult to accommodate the wasted handle movement in a package which seeks to maximize efficient body design.

BRIEF SUMMARY OF THE INVENTION

The present invention addresses the deficiencies in conventional belt clutch control apparatus as described above. It is a principal object of this invention to eliminate the use of an overcenter link and the associated disadvantages in a belt clutch control apparatus.

Another object of this invention is to provide a belt clutch apparatus which requires less control handle movement than known systems.

A further object is to provide such apparatus which requires comparatively less force on the control handle to engage and disengage.

A still further object is to provide a belt clutch control apparatus suitable for using an idler pulley spring having a significantly lower spring rate than with conventional systems.

In order to achieve these and other objectives, this invention comprises a belt clutch control apparatus utilizing a linkage system which does not incorporate an overcenter connecting link. The connecting link of this apparatus moves between first and second undercenter positions, corresponding to the on and off positions, respectively, of the control handle. The connecting link of this invention is never moved through an overcenter position. An assist spring is provided to bias the connecting link in both its first and second undercenter positions, thereby holding the control handle in its on and off positions and allowing the use of an idler pulley spring having a lower spring rate than with conventional systems. The assist spring partially counteracts the force of the idler pulley spring on the control handle, thereby reducing the force necessary to engage and disengage the apparatus. The linkage includes a bellcrank which rotates in a vertical plane upon movement of the cutting deck to maintain substantially constant tension on the idler pulley spring regardless of the deck height.

The above stated and other objects will become apparent to those skilled in the art upon reading the following detailed description, taken in conjunction with the enclosed drawings.

BRIEF DESCRIPTION OF THE DRAWINGS

FIG. 2 is a top plan view of the belt clutch control apparatus and belt drive system of the present invention, shown with the drive system in its engaged condition;

FIG. 3 is a top plan view similar to FIG. 2, with the belt drive system shown in its disengaged condition.

DETAILED DESCRIPTION OF THE PREFERRED EMBODIMENT

Initially, it is noted that the belt clutch control apparatus of this invention comprises a unique linkage system which provides distinctive advantages over conventional systems. Individually, the major components of this invention are of generally conventional design and function. In general terms, the present invention serves to move an idler pulley between engaged and disengaged positions in response to movement of a control handle between on and off positions, respectively. Therefore, in the following description it is to be understood that the terms "on" and "engaged" are essentially synonymous terms used to describe the condition wherein the idler pulley is moved to tighten the belt, thereby operatively connecting the driving pulley with driven pulleys. Likewise, the terms "off" and "disengaged" synonymously correspond to the idler pulley position wherein the driving pulley is not operatively connected to the driven pulleys due to the slack condition of the drive belt. The interchangeable use of these terms will be well understood to those skilled in the art.

Figure 1:
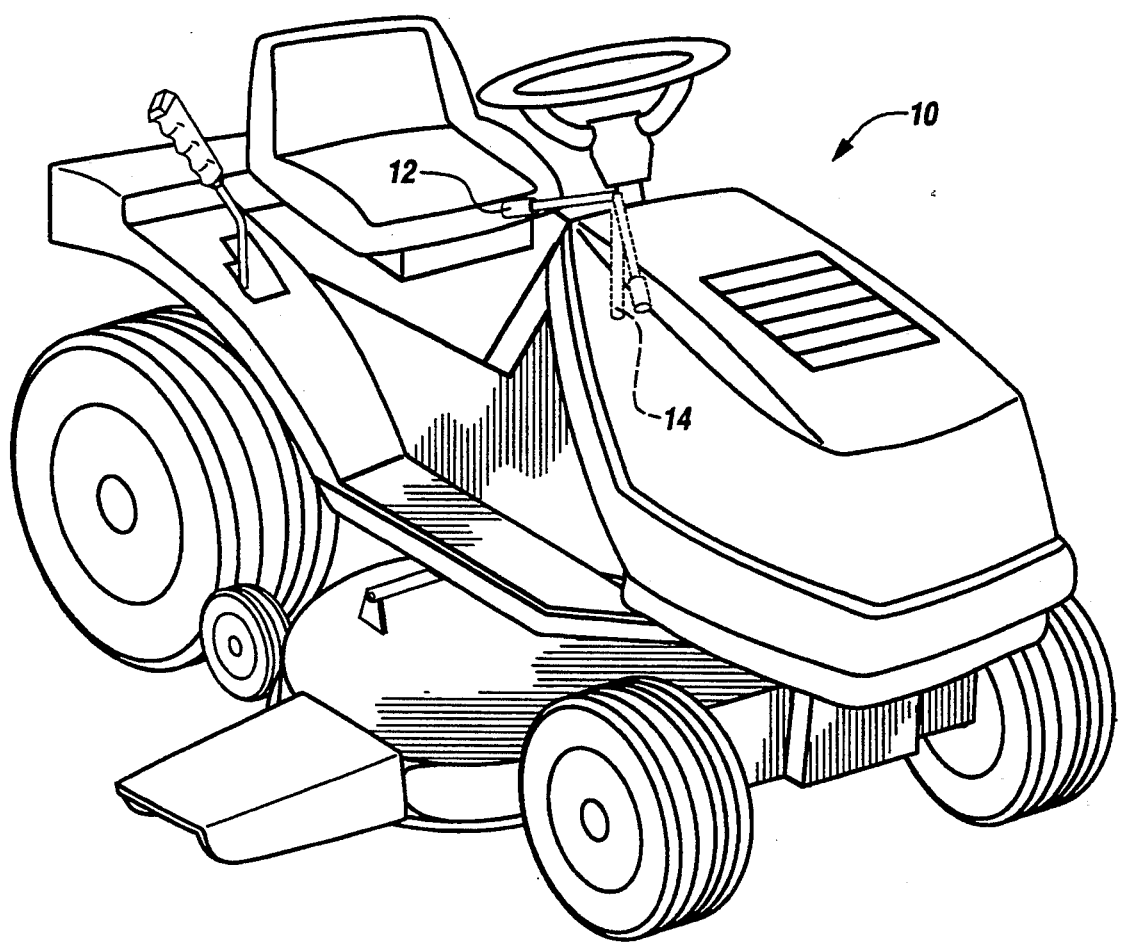
FIG. 1 is a perspective view of a riding mower incorporating the belt clutch apparatus of the present invention.

Referring now to FIG. 1, riding mower 10 is shown having a control handle 12 used to selectively engage and disengage the cutting blade. Control handle 12 is moveable by the operator of mower 10 between an "on" position shown in broken line and an "off" position shown in solid. Movement of control handle 12 serves to rotate control shaft 14, which extends through the body and frame members of mower 10 and is mounted therein by conventional mounting means (not shown for the sake of simplicity).

With reference now to FIGS. 2 and 3 the belt clutch control apparatus, identified generally by reference numeral 16, is incorporated in a belt drive system comprising driving pulley 18, driven pulleys 20 and 22, and idler pulley 24. As those skilled in the art will readily understand, driving pulley 18 is operatively connected to the engine of mower 10, and driven pulleys 20 and 22 have shafts 28 and 30 attached thereto, with shafts 28 and 30 extending downward through the top surface of cutting deck 22 and attached to cutting blades housed therein. Continuous belt 32 encircles driving pulley 18 and driven pulleys 20 and 22, and serves to transmit power from driving pulley 18 to driven pulleys 20 and 22, thereby causing operative rotation of the cutting blades.

Idler pulley 24 is rotatably mounted in bracket 34, which is pivotally mounted to cutting deck 26. As explained more fully below, the unique linkage of the present invention operates to selectively move idler arm 34 and idler pulley 24 between the engaged position shown in FIG. 2, wherein belt 32 is relatively taught, and the disengaged position shown in FIG. 3, wherein belt 32 is relatively loose.

Figure 4:
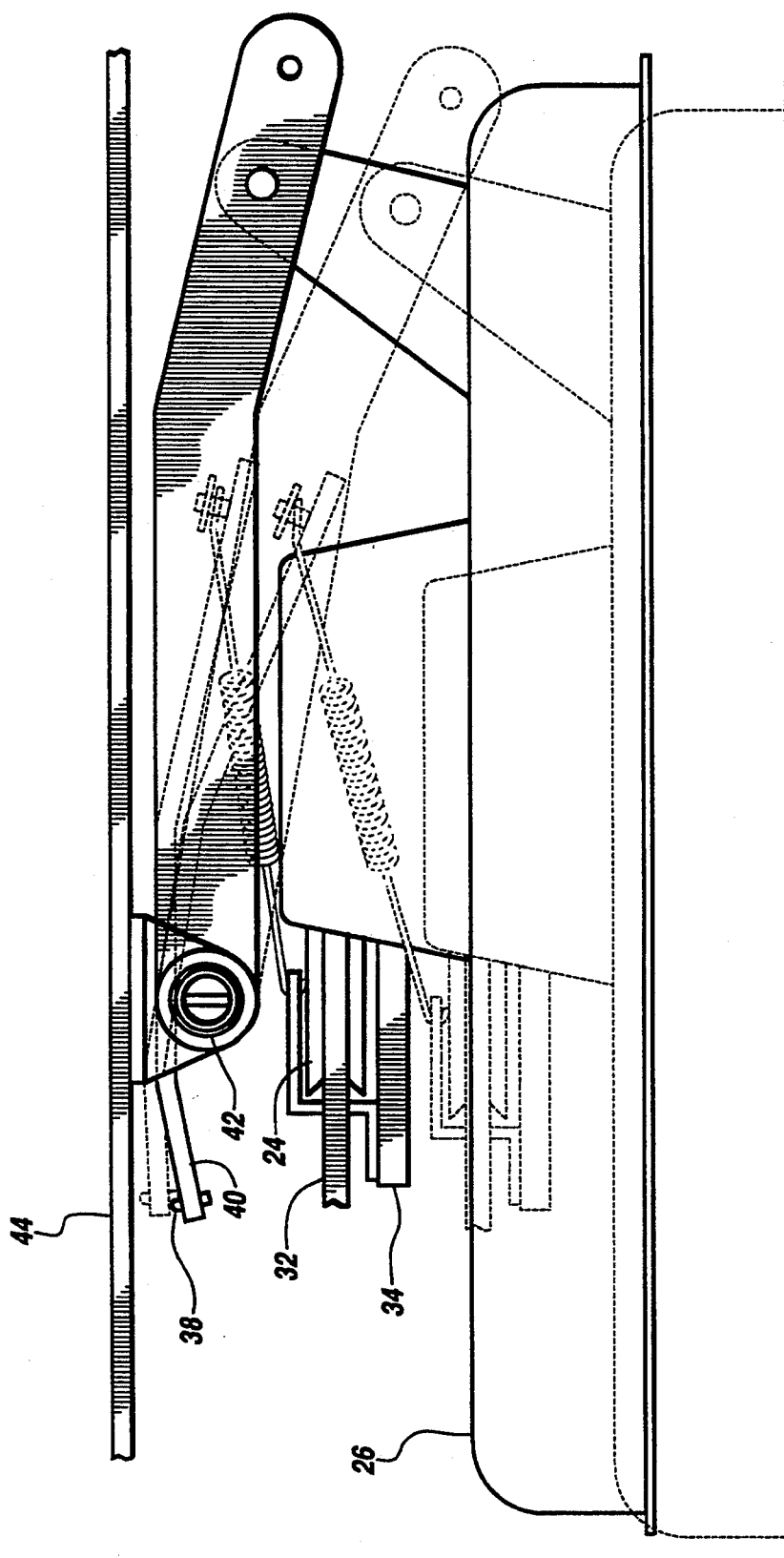
FIG. 4 is an enlarged side elevational view showing certain components of the belt clutch control apparatus at multiple positions of the cutting deck.

Control shaft 14 serves as the axis of rotation for control handle 12 and lever 36 is fixedly secured to the lower, distal end of shaft 14 and extends therefrom at a substantially right angle. A first end of connecting link 38 is pivotally connected to lever 36, with the opposite end being pivotally connected to bellcrank 40. Bellcrank 40 is pivotally connected to lateral tube member 42, which is pivotally suspended from frame 44 and serves as a primary support member for cutting deck 26, as best shown in FIG. 4. Tension spring 46 interconnects end 48 0#bellcrank 40 with idler arm 34, and serves to pull idler pulley 24 into its engaged position shown in FIG. 2 and maintain adequate tension on belt 32, thereby allowing transmission of power and rotational movement from driving pulley 18 to driven pulleys 20 and 22.

In the engaged, or "on", position shown in FIG. 2, control handle 12 has been rotated to its counterclockwise position with the distal end of lever 36 resting against stop 50 which extends downwardly from frame 44. Assist spring 52, having one end anchored to frame 44 and the other end attached to connecting link 38, operates to pull lever 36 and handle 12 in the counterclockwise direction to maintain control apparatus 16 in its engaged condition. Since assist spring 52 secures control apparatus 16 in its engaged position, the force from spring 46 is preferably not involved in holding handle 12 in its on position. This contrasts sharply with conventional linkages which depend upon the idler pulley spring to retain the overcenter link in its overcenter position.

In the preferred embodiment shown, the first end of spring 52 is attached to a post extending from frame 44, and the opposite end of spring 52 is attached to the end of connecting link 38 which is formed at a right angle to the main body of link 38 and inserted through a hole in lever 36. A cotter pin or other suitable device is used to secure the end of link 38 within the hole. The opposite end of connecting link 38 is similarly formed and inserted through a hole formed in bellcrank 40.

It will be appreciated that maximum movement of bellcrank 40 also maximizes the available motion to stretch spring 46. The stiffness of spring 46 may therefore be reduced since it is stretched more to achieve the load necessary to drive the cutting blades via belt 32. As with conventional systems, it is desirable to overstretch spring 46 in a new system so that a certain amount of relaxation can occur to accommodate normal wear of belt 32 without necessitating adjustment. But, the reduced spring rate made possible by this invention significantly reduces the load on belt 32 as compared to conventional systems, thereby prolonging the life of belt 32 and further increasing adjustment intervals.

In moving from the on to the off position, control handle 12 and lever 36 are moved in a clockwise direction from the position shown in FIG. 2 to the position shown in FIG. 3. During such movement, the point of attachment between lever 36 and connecting link 38 never crosses the line formed between shaft 14 and the point of attachment between connecting link 38 and bellcrank 40. Accordingly, as those skilled in the art will readily appreciate, connecting link 38 is never forced into an overcenter position throughout its range of movement; both the on and off positions, and all intermediate positions, represent undercenter positions. The use of exclusive undercenter movement eliminates the additional travel, and consequential wasted movement of control handle 12, which would be required to overcenter the linkage, thereby maximizing the motion available for moving bellcrank 40.

With control apparatus 16 in its off position shown in FIG. 3, spring 52 operates to hold the distal end of lever 36 against stop 54 which extends downwardly from frame 44. During movement of control handle 12 between its on and off positions, the forces exerted by tension springs 52 and 46 tend to offset one another, resulting in a significantly reduced net torsional force about shaft 14 when compared with conventional overcenter control linkages. Conventional overcenter linkages require a considerable amount of force exerted through the control handle in order to overcome the tendency to remain in either the on or off positions. With control apparatus 16, the counteracting effect of springs 46 and 52 greatly reduces the amount of effort required to move handle 12 from one position to the other. This feature, coupled with the use of purely undercenter movement for connecting link 38 and reduced spring rate for spring 46, effectively eliminates the high degree of force normally required to move a belt clutch control apparatus between its on and off positions.

In the preferred embodiment shown, bellcrank 40 is pivotally mounted to lateral tube 42 at point 56. As best illustrated in FIG. 4, this arrangement allows bellcrank 40 to rotate vertically with lateral tube 42 upon raising and/or lowering cutting deck 26. Such movement of bellcrank 40 avoids overstretching spring 46 which would occur if bellcrank 40 were secured to the underside of frame 44 as in conventional apparatus. This feature eliminates the degree of slippage normally allowed between the bellcrank and idler pulley spring to compensate for a non-rotating bellcrank, thereby further reducing the total amount of travel required for control handle 12.

While the use of an undercenter linkage in a belt clutch control apparatus has been made clear from the enclosed disclosure, it is expected that certain modifications may be made to the embodiment disclosed herein without departing from the spirit and scope of the present invention. It should also be understood that this specification is by illustration only and that the invention is not necessarily limited to the specific embodiment disclosed herein, since alternative embodiments and operating techniques will become apparent to those skilled in the art in view of this disclosure.

What is claimed is:

1. A belt clutch control apparatus for controlling the transmission of power from a driving pulley to a driven pulley operatively connected by a drive belt, said apparatus being operative to selectively move an idler pulley between engaged and disengaged positions relative to the belt, said apparatus comprising:

a control handle, selectively moveable between on and off positions, having a shaft extending therefrom at a substantially right angle and rotatable about an axis upon movement thereof, said shaft having a distal end;

linkage means, including a connecting link attached to said distal end of said shaft and moveable between first and second under-center positions relative to said axis in response to movement of said handle between said on and off positions, respectively, said linkage means interconnecting said distal end of said shaft and said idler pulley, operative to move said idler pulley to said engaged position upon rotation of said shaft resulting from movement of said control handle to said on position, and biasing means for urging said connecting link into said first under-center position, thereby maintaining said handle in said on position.

2. A belt clutch control apparatus as set forth in claim 1, wherein:

said linkage means is further operative to move said idler pulley to said disengaged position upon movement of said handle to said off position; and said biasing means is further operative to urge said connecting link to said second under-center position, thereby maintaining said handle in said off position.

3. A belt clutch control apparatus as set forth in claim 1, wherein said biasing means comprise a tension spring.

4. A belt clutch control apparatus for selectively engaging and disengaging a driving pulley and a driven pulley utilizing a belt and idler pulley, said apparatus having a control handle selectively moveable between engaged and disengaged positions and linkage means interconnecting said control handle and said idler pulley, wherein said linkage means comprise:

a control shaft, rotatable about an axis in direct response to movement of said control handle, having a distal end;

a lever, fixedly secured to said distal end of said control shaft;

a first tension spring member operatively connected to said lever and maintaining an amount of tension thereon;

a connecting link, having a first end hingedly connected to said lever at a first connecting point, and a second end extending therefrom;

a bellcrank, having a first end hingedly connected to said second end of said connecting link at a second connecting point, and a second end extending therefrom, said bellcrank being pivotable about a third point intermediate said first and second ends thereof;

a second tension spring member interconnecting said second end of said bellcrank and said idler pulley, whereupon movement of said control handle to said engaged position effects translation of said connecting link and resulting pivotal movement of said bellcrank, thereby causing said second tension spring member to pull said idler pulley to said belt to eliminate slack therein; wherein said control handle is securable in said engaged position exclusively by the tension of said first tension spring member acting on said lever.

5. A belt clutch apparatus as set forth in claim 4, wherein:

said first connecting point does not cross the line formed between said second connecting point and said axis during movement of said control handle between said engaged and disengaged positions.

6. A belt clutch control apparatus as set forth in claim 4, adapted for use on a riding mower having a cutting deck selectively moveable between a plurality of vertical cutting position, wherein:

said bellcrank is pivotally secured to said mower in a manner allowing vertical rotational movement thereof upon vertical movement of said cutting deck, thereby maintaining substantially constant tension on said second tension spring throughout vertical movement of said cutting deck.

7. A belt clutch control apparatus for use on a riding mower having a belt driven cutting mechanism comprising a driving pulley and a driven pulley operatively interconnected by a belt, said mower having a cutting deck selectively moveable between a plurality of vertical cutting positions, said apparatus comprising:

a control handle, selectively moveable between on and off positions;

a control shaft mounted to said mower, rotatable about an axis in direct response to movement of said control handle, having a distal end;

a lever, fixedly secured to said distal end of said control shaft;

a connecting link, having a first end hingedly connected to said lever at a first connecting point, and a second end extending therefrom;

a bellcrank, having a first end hingedly connected to said second end of said connecting link at a second connecting point, and a second end extending therefrom, said ballcrank being horizontally pivotable about a third point intermediate said first and second ends thereof;

an idler pulley, operative to tighten said belt on said belt driven cutting mechanism in response to movement of said control handle to said on position;

a tension spring member interconnecting said second end of said bellcrank and said idler pulley, whereupon movement of said control handle to said engaged position effects translation of said connecting link and resulting pivotal movement of said bellcrank, thereby causing said tension spring member to pull said idler pulley into said belt to eliminate slack therein; wherein said bellcrank is vertically rotatable upon vertical movement of said cutting deck, thereby maintaining substantially constant tension in said tension spring throughout movement of said cutting deck.

8. A belt clutch control apparatus as set forth in claim 7, wherein:

said connecting link is moveable between first and second under-center positions in response to movement of said control handle between said on and off positions, respectively.

9. A belt clutch control apparatus as set forth in claim 8, further comprising:

an assist spring, operative to retain said connecting link in said first position when said control handle is moved to said on position.

10. A belt clutch control apparatus as set forth in claim 9, wherein:

said assist spring is further operative to retain said connecting link in said second position when said control handle is moved to said off position.

11. A belt clutch control apparatus for controlling the operation of the cutting blades on a riding mower, said apparatus being operative to selectively establish driving communication between a driving pulley connected to a motor and a driven pulley connected to a cutting blade, said communication being provided by a drive belt, said apparatus comprising:

a control handle, selectively moveable between on and off positions;

a connecting link, moveable between first and second undercenter positions in response to movement of said control handle between said on and off positions, respectively;

an assist spring for retaining said connecting link in said first position;

an idler pulley, moveable between engaged and disengaged positions relative to said belt in response to movement of said connecting link between said first and second positions, respectively, said idler pulley being operative when in said engaged position to establish communication between said driving pulley and said driven pulley; and linkage means, operatively connecting said control handle, said connecting link, and said idler pulley.

* * * * *